3,272,764
PROCESS FOR PREPARING CELLULAR POLYMERIC PRODUCTS
Max B. Mueller, Morristown, and Theodore Largman, Madison, N.J., assignors to Allied Chemical Corporation, New York, N.Y., a corporation of New York
Filed Feb. 21, 1963, Ser. No. 260,222
16 Claims. (Cl. 260—2.5)

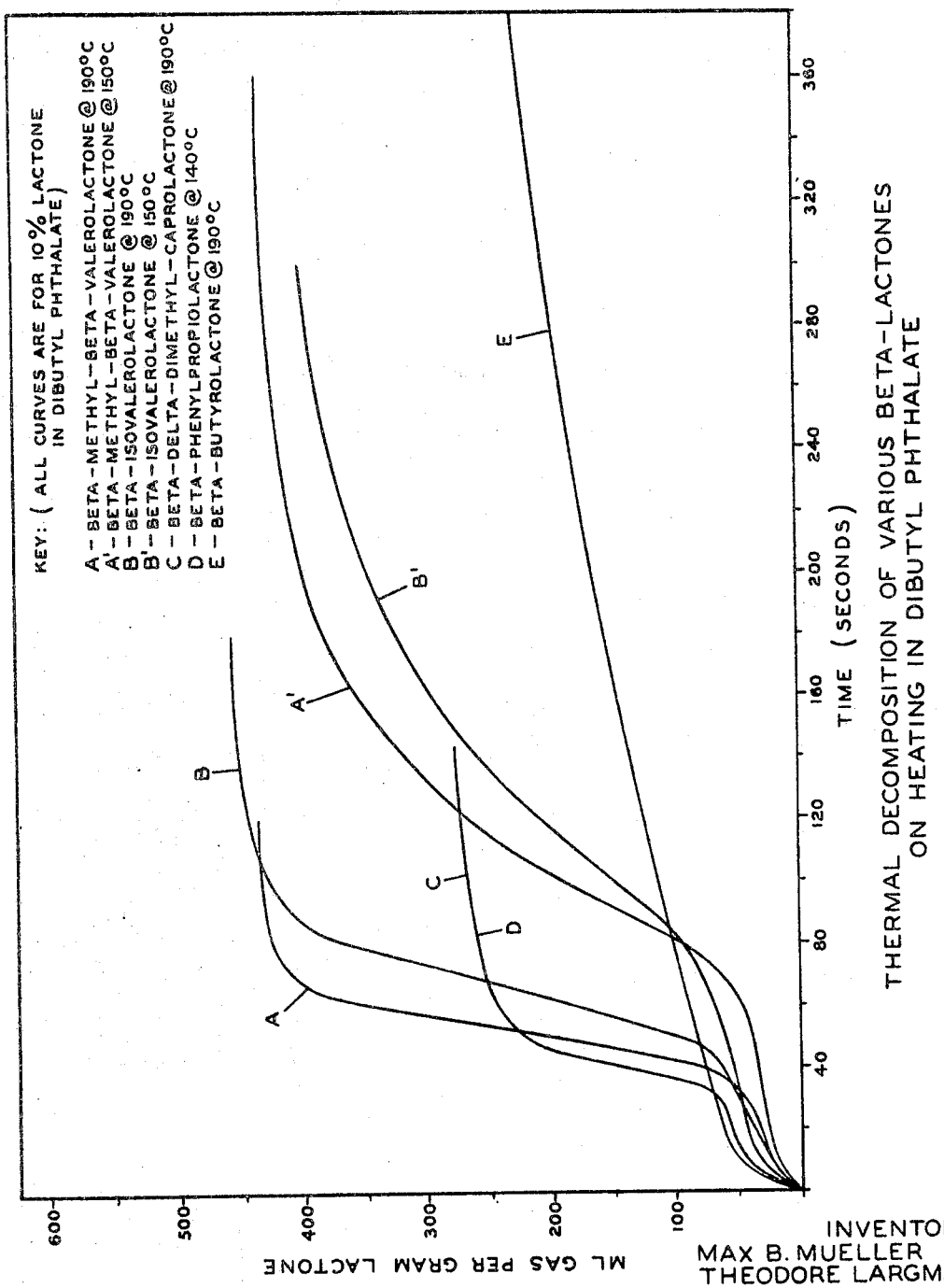

This invention relates to the preparation of cellular products such as polymer foams, and more particularly to a process for preparing solid cellular polymeric materials.

In the preparation of cellular products it has been the practice to incorporate into the base material a solid blowing agent which, under the influence of heat, evolves a gas within the base material causing the formation of numerous cells which impart porosity and low density to the finished product.

The solid blowing agents heretofore used, such as sodium and ammonium carbonate, diazoaminobenzene, etc., are difficult to disperse in polymeric materials and a number of them impart odor or discolor the polymer, while still others, notably di-N-nitroso-pentamethylene-tetramine, are hazardous because of their explosive nature. The popular isocyanates are somewhat toxic and thus require precautions in handling. Furthermore, many of the prior art blowing agents leave unwanted impurities or contaminants in the polymer structure.

An object of the present invention is to provide a process for preparing cellular polymeric materials in a manner which is easily carried out, and which does not involve the use of toxic or hazardous blowing agents.

Another object of the invention is to provide a process for preparing cellular polymeric materials through the use of blowing agents whose residues are compatible with the plastic to be foamed and which have no adverse effects on the properties of the plastic to be foamed.

A still further object of the invention is to provide a polymeric mixture which on exposure to heat is foamed and cross linked in a single operation.

These and other objects are accomplished according to our invention, wherein a normally solid, thermoplastic macromolecular polymeric material, having a decomposition temperature above about 200° C., and a softening temperature below about 150° C. is heated in the presence of a small proportion of a liquid beta propiolactone to a temperature effective to decompose the beta propiolactone, whereby carbon dioxide and a polymerizable monomer are formed, giving rise to the formation of bubbles in the polymeric material, the heated mass is permitted to expand while preventing escape of substantial proportions of carbon dioxide from the polymer mass, and thereafter cooling the polymer mass before a substantial proportion of the thus generated carbon dioxide has escaped from the polymeric mass.

In the drawing, the single figure illustrates by a series of curves, the milliliters of gas evolved per gram, of five different beta propiolactones per second of heating, when 10% mixtures thereof in dibutyl phthalate, are heated at temperatures effective to decompose the beta propiolactone. Thus curves A and A' illustrate the gas evolution curves of beta methyl beta valerolactone when heated at 190° C. and 150° C., respectively; curves B and B' illustrate the gas evolution curves of beta isovalerolactone when heated at 190° C. and 150° C., respectively; curve C illustrates the gas evolution curve of beta delta dimethyl caprolactone heated at 190° C.; curve D (which is substantially identical with curve C) illustrates the gas evolution curve of beta phenyl propiolactone at 140° C.; curve E illustrates the gas evolution curve of beta butyrolactone at 190° C.

The beta propiolactones used as blowing agents in our invention are well known compounds and have been used in the past as intermediates in the preparation of polymerization compounds. They have the advantage, when used as blowing agents according to our invention in being decomposable by heat to form only carbon dioxide which serves as a blowing agent, and a polymerizable monomer which is utilizable as a component of the polymer either as such or as a cross-linking agent, or, if the polymerizable monomer is a gaseous monomer it may itself serve as an auxiliary blowing agent to enhance the blowing action of the carbon dioxide.

The beta propiolactones useful as foaming agents in our invention, are represented by the structural formula shown on the left in Equation 1 below, with heat decomposition products shown on the right and constituting solely a polymerizable monomer and carbon dioxide blowing agent.

1)
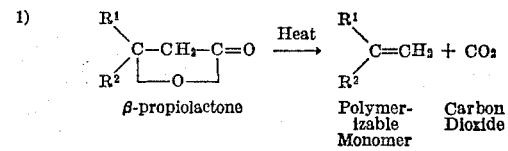

wherein $R^1$ is hydrogen or lower alkyl; $R^2$ is hydrogen, methyl, phenyl, lower alkene or carboxy (lower) alkyl, and wherein $R^1$ and $R^2$ together are

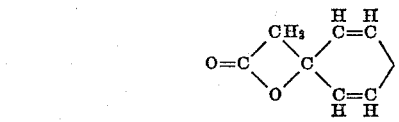

The beta propiolactones may be prepared, as is well known, by the condensation of a ketene with a carbonyl compound such as an aldehyde in the presence of zinc or aluminum chloride as described in U.S. Patent 2,356,459 granted August 22, 1944, to Frederick E. Kung, and as illustrated in the Equation 2 below.

(2)
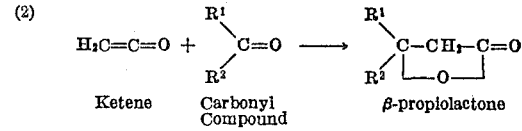

wherein $R^1$ and $R^2$ are as specified above.

Examples of suitable β-propiolactones and their decomposition products are shown below.

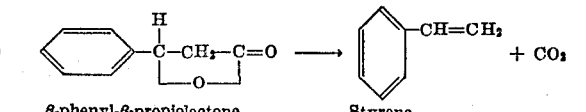

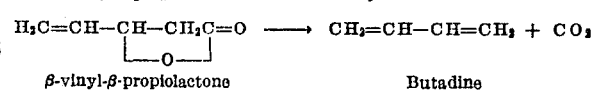

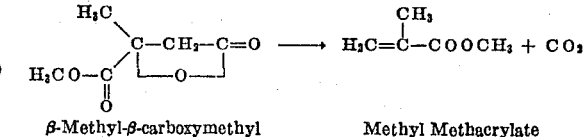

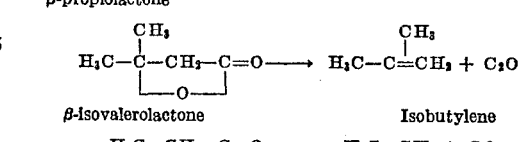

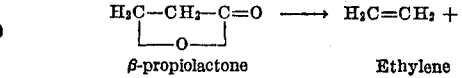

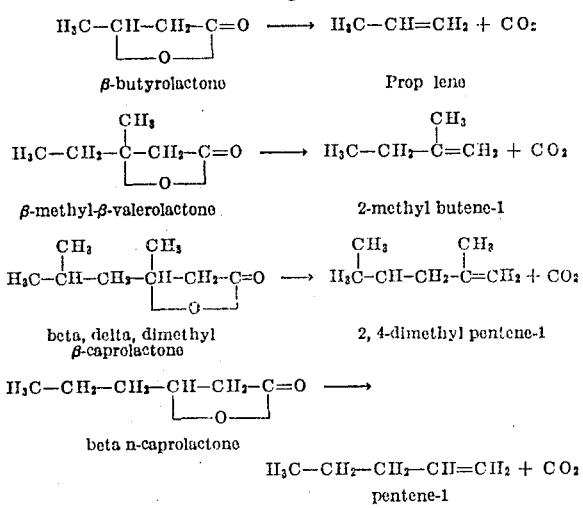

Another suitable lactone is the dilactone of the structure shown below which decomposes to xylylene and carbon dioxide

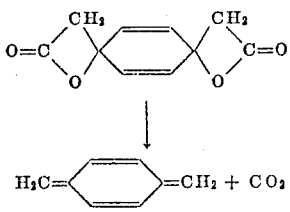

In carrying out the process according to our invention the beta propiolactone may be mixed with the polymeric material to be foamed, either after formation of the polymer or simultaneously with the formation of the polymer. When beta propiolactone is added during the polymerization step, it is available in intimate association with the polymer immediately upon its formation and is capable of reacting to release carbon dioxide and polymerizable monomer, whenever the decomposition temperature of the beta propiolactone is reached. Thus, the polymer is expanded by virtue of the released gas, and the polymerizable monomer released aids in the polymerization or cross linking of the parent polymer. In a number of cases, the polymerizable monomer as released, is itself a gas and thus contributes to the foaming and expansion of the polymer. For example, ethylene results from the decomposition of beta propiolactone, propylene from beta butyrolactone, isobutylene from beta isovalerolactone and butadiene from beta vinyl-beta propiolactone.

According to one embodiment of our invention, a beta propiolactone of the character described is blended with the polymer which is to be foamed and, if desired, cross linked. Such blends are conveniently prepared by melting or softening the polymer, adding the liquid beta propiolactone and blending the components as by milling, at elevated temperatures below the decomposition temperature of the beta lactone, usually not more than about 100° C., until homogeneous. The mixture may then be sheeted or placed in a mold, and is then heated to a temperature such as to cause decomposition of the beta propiolactone, usually between about 130° C. and about 250° C. The carbon dioxide gas resulting from the decomposition of the beta propiolactone takes the form of bubbles which expand the polymer to the desired degree, depending on the proportion of beta propiolactone employed and to some extent on the temperature and time of heating employed. Usually a very short period suffices, usually between about 30 seconds and about 5 minutes.

Any natural or synthetic polymeric materials, or mixtures thereof, capable of being foamed, i.e. any thermoplastic polymeric material, may be foamed, including the natural and synthetic rubbers, polystyrene, polymethylstyrene, polymethyl acrylate, polyvinyl choride, polyvinylidene chloride, polyisobutylene, polyethylene, chlorinated polyethylene, polypropylene, polyesters, polyamides, polyacrylates, polyacrylonitrile, polymers of chorofluoro ethylenes, and the like.

In another modification of our process the beta propiolactone is blended with suitable monomers which are to be polymerized. In this case the liquid beta propiolactone is mixed with the liquid monomer, or if desired with a prepolymer thereof, and becomes a part of the polymerization medium. Either during or after polymerization of the monomer, or mixtures thereof, the polymerizing monomer or the finished polymer is subjected to heat treatment causing liberation within the polymeric material of $CO_2$ gas and a polymerizable monomer whose character depends on the particular beta propiolactone employed. Any polymerizable monomer may be thus blended with beta propiolactone, including the monomers of the polymeric materials mentioned above.

The particular beta propiolactone used may be selected to yield a polymerizable monomer identical with or different from that of the monomer of the material with which it is incorporated. Thus incorporation of β-phenyl-β-propiolactone into a styrene polymer or monomer yields $CO_2$ blowing agent and styrene on heating, thus causing no contamination of the resulting foamed polymer with any different monomer. Similarly, β-vinyl-β-propiolactone may be incorporated into butadiene polymer without contamination of the resulting expanded polymer. When the beta propiolactones are decomposed in the presence of a polymerizing vinyl composition such as styrene, a thermoplastic foam is produced. When cross-linking is desired, it is usually advantageous to incorporate the particular beta propiolactone derivative which will cause production of the desired cross-linking agent. In this process it is thus possible to polymerize, cross-link and "blow" the composition in a single operation.

Uncross-linked polyester resins in solution in cross-linking monomers are advantageously treated by the addition of beta propiolactones thereto prior to polymerization. Thus, β-phenyl-β-propiolactone which gives rise, on heating to styrene cross-linking agent plus $CO_2$ blowing agent when added to an unsaturated polyester, for example, a phthalic anhydride-ethylene glycol-maleic anhydride reaction product together with or without styrene and a catalyst such as benzoyl peroxide, produces a rigid polyester foam when the mixture is heated to 100° C. The polymerization of styrene and the polyester resin is an exothermic reaction and the temperature rapidly rises to about 210° C., giving rise to decomposition of the beta propiolactone with resultant foaming of the cross-linked polymer.

The beta propiolactones may advantageously be used to produce foams from polymers capable of being cross-linked with the polymerizable decomposition product of the beta lactone. Examples of such polymers include, for example, diallyl phthalate prepolymer, the linear condensation polymers of 1,1-bis(hydroxy methylethylene) with di-basic acids such as phthalic or adipic acids, chlorendic acids, glycol-maleic anhydride condensation resins, etc.

The dilactone of the formula

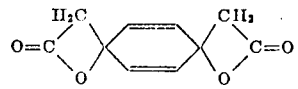

is especially adapted for addition to monomers such as styrene and methyl methacrylate to produce foamed polymers by virtue of the $CO_2$ evolved, which are cross-linked by the other decomposition product xylylene to produce rigid or flexible, thermoset foamed polymers.

In a third modification of our invention the β-propiolactones are used in the preparation of vinyl plastisols, e.g.

fluid mixtures of solid polyvinyl chloride particles suspended in liquid plasticizers such as dioctyl phthalate or other liquid plasticizing medium, for example, a dialkyl phthalate mixed with other liquid plasticizer such as diaryl phosphates, alkylated benzene, epoxidized drying oils, etc., which on heating become homogeneous plasticized polyvinyl chloride compositions by adsorption of the plasticizer by the particles. The plastisol will be formulated so that the temperature at which the polymer beads and plasticizer become a homogeneous plastic mass, is approximately the same as the decomposition temperature of the particular beta lactone used. When the beta propiolactones of our inventions are mixed with such vinyl plastisols, the mixture may be spread on a surface such as cloth, paper, etc., heated to foam the vinyl plastic which simultaneously is foamed by the gases released by the beta propiolactone.

The proportion of beta propiolactone used is not critical, but should be sufficient to produce the desired degree of cell formation and expansion of the product. Even very small quantities may be sufficient in some cases, for example, when the product is to be used as a synthetic leather or other only slightly expanded product. In such cases, as little as a fraction of a percent of the beta propiolactone by weight based on the weight of the monomer or polymer may suffice. On the other hand, when very light, highly expanded products are to be produced larger proportions of beta propiolactones will be employed, for example, as high as 20% or higher. In general, however, proportions of beta propiolactone by weight, based on the weight of the monomer or polymer, will be between about 0.1% and about 10%.

The temperature to which the compositions to be foamed are heated will vary somewhat depending on the character of the polymeric material, the amount and character of the particular beta propiolactone derivative employed, and rapidity and extent of foam production desired. The beta propiolactones used in our invention have decomposition temperatures in the range between about 100° C. and about 250° C. which render them useful in the foaming of polymers which are fluid or plastic within these ranges. In general, heating temperatures between about 130° C. and about 250° C. are satisfactory, the higher temperatures resulting in more rapid foam development. In general, temperatures between about 150° C. and about 200° C. are preferred.

Our invention is capable of producing either open cell or closed cell foams depending on the processing technique employed. Such processing techniques are conventional. Usually a closed cell foam is produced by heating the blended polymer and beta propiolactone under pressure in a confined space or mold, wherein the decomposition of the beta propiolactone and the fusion of the resin may occur simultaneously under the influence of heat. After the plastic mass has been cooled, pressure is released, and the preformed body may be post expanded in an oven if desired. The cooling and reheating cycles can be eliminated by simultaneous cross-linking of the polymer during blowing. Closed cell plastics can also be prepared by decomposing the beta propiolactone during the foaming operation, for example in an extruder.

Open cell foams can be prepared by decomposing the beta propiolactone while the plastic mass still has a comparatively low viscosity and then subsequently fusing the foam structure at higher temperature.

The foaming process may be carried out in a batchwise procedure or continuously, for example, during extrusion, calendering, coating or the like.

Additives such as pigments, dyes, plasticizers, stabilizers, flame retardants, etc. may be included in our compositions either before or during the blowing operation.

The resulting foamed plastics have a multitude of uses, many of which are well recognized and well established, depending on the character of the polymer foamed and the foaming technique used.

Thus the foams are useful in low temperature insulation, in the preparation of linings for clothing, as cushioning material in packaging fragile objects, as cores between paper liners, as beach toys and life preservers, in architectural panels, in fact, in any application where the properties of the parent polymers combined with low density are useful.

The following specific examples further illustrate our invention. Parts are by weight except as otherwise noted.

EXAMPLE 1

$\beta$-phenyl-$\beta$-propiolactone was prepared as follows: 200 grams of benzaldehyde (1.88 moles) and 0.2 gram of anhydrous zinc chloride were charged to a reaction vessel equipped with stirrer and thermostat. Gaseous ketene was then passed through the liquid reaction mixture while maintaining the temperature between about 0° C. and about 10° C. The stream of ketene was continued with stirring for 2 hours forty minutes after which 3.35 grams of ketene had reacted.

The resulting crude liquid $\beta$-phenyl-$\beta$-propiolactone was taken up in benzene and was washed with cold (5° C.) 5% sodium hydroxide solution to neutralize the catalyst, followed by a water wash. It was then washed four times with a saturated aqueous solution of sodium bisulfite to remove remaining aldehyde. The solution was then treated with calcium sulfate ("Drierite") to remove traces of water and the remaining benzene solvent evaporated under vacuum.

Five parts of the purified $\beta$-phenyl-$\beta$-propiolactone, prepared as described above, was placed in a vessel containing 100 parts of an unsaturated polyester resin prepared by condensing equal parts of phthalic anhydride, maleic anhydride and propylene glycol, together with 1% of benzoyl peroxide based on the weight of the resin. The reactants were thoroughly mixed, and then heated to 100° C. causing decomposition of the $\beta$-phenyl-$\beta$-propiolactone to carbon dioxide and styrene and producing a well cured rigid infusible polyester foam.

EXAMPLE 2

Beta isovalerolactone prepared by reacting acetone with ketene was tested as a foaming agent for a flame retardant chlorinated polyethylene insulation composition by first blending the components listed below.

| | Parts |
|---|---|
| Epoxidized soya bean oil | 50.0 |
| Beta isovalerolactone | 5.0 |
| Dibasic lead phosphite (Dyphos) stabilizer | 2.0 |
| Titanium dioxide | 1.0 |
| Flame retardant (calcium petronate [1]) | 2.0 |
| | 60.0 |

[1] Calcium sulfonate complex of oil soluble alkyl aryl sodium sulfonate.

To 8 parts of the above mixture was added 10 parts of a high molecular weight chlorinated polyethylene in powder form (Sample A), prepared by chlorinating a polyethylene of about 1.4 million molecular weight to 73% chlorine. To another 8 parts of the above mixture, 20 parts of the same chlorinated polyethylene was added (Sample B). These compositions were thoroughly mixed and placed in separate aluminum cups, approximately 2" in diameter by ¾" deep, to fill the cups to a depth of ¼". The cups were then placed into a 164° C. oven and allowed to remain there for 15 minutes whereupon homogenization and softening of the mix took place accompanied by foaming and expansion of the composition due to release of carbon dioxide.

Upon removal of the cups from the oven the height of the expanded composition was measured and the character of the cell formation examined. Sample A was found to have expanded to a height of ⅜" and had excellent cell uniformity; Sample B had expanded to ½" and had good cell uniformity. Both were rigid foams.

EXAMPLE 3

In order to compare the efficacy of beta isovalerolactone with commercial foaming agents in polyvinyl chloride plastisol formulations, three test formulations were prepared, one of which contained β-isovalerolactone as foaming agent, and two of which contained commercial blowing agents. In each formulation the polyvinyl chloride was present in the form of solid beads dispersed in the plasticizer, and the beta isovalerolactone was in solution or dispersion in the plasticizer. Each formulation was heated to 350° F. for 15 minutes to produce a plasticized polyvinyl chloride plastic which was substantially simultaneously converted into a foamed product.

Formulations and results are shown in Table I below.

*Table I*

| Formulation | 1 | 2 | 3 |
|---|---|---|---|
| Polyvinyl chloride ("Geon 121") | 100 | 100 | 100 |
| Stabilizer | 2 | 2 | 2 |
| Di-2-ethylhexyl phthalate | 90 | 90 | |
| Di-tridecyl phthalate | | | 45 |
| Polymeric Plasticizer | | | 45 |
| Commercial blowing agent: | | | |
| 1 | 2 | | |
| 2 | | 2 | |
| Beta isovaleroactone | | | 2 |
| Fusion Condition: | | | |
| Temperature ° F | 350 | 350 | 350 |
| Time | 15 | 15 | 15 |
| Comments | (¹) | (¹) | (¹) |
| 1 "Nitrosan" (N, N'Dimethyl-N, N'dinitrosoterephthalamide) | (²) | (²) | (²) |
| 2 "Celogen AZ" (Azobis formamide) | | | |

¹ Good foam.
² Blowing agent slow to decompose.

EXAMPLE 4

As a test of the relative foaming efficiencies of a number of substituted beta propiolactones, ten parts of lactone were mixed with 90 parts of dibutyl phthalate in a closed vessel equipped with gas outlets and a device for measuring gas emission. The several mixtures were heated to their decomposition temperatures, and the volume in milliliters of gas evolved per gram of beta lactone, measured as a function of time in seconds at the indicated temperature. The following beta lactones were heated to the indicated temperatures for times sufficient to produce maximum gas development with the results shown in Table II below and as illustrated in the drawing.

*Table II*

| β-Lactone | Temp., °C. | Max. Volume gas-ml. per grm. agent | Time for development of Max. gas Vol. Sec. |
|---|---|---|---|
| β-methyl-β-valerolactone | 190 | 430 | 80 |
| Do | 150 | 430 | 360 |
| β-isovalerolactone | 190 | 450 | 140 |
| β,δ-dimethyl caprolactone | 190 | 270 | 120 |
| β-phenyl propiolactone | 140 | 270 | 140 |
| β-butyrolactone | 190 | 230 | 400 |

In comparison with the above, of three commercial blowing agents tested under the same conditions, the best produced a maximum gas evolution of 330 ml. in about 250 seconds heating at 190° or 220° C., azobisformamide (Celogen AZ); another produced a maximum of about 250 ml. upon heating at 190° C. for 300 seconds, 4,4'-oxybis(benzene sulfonyl hydrazide) (Celogen), and the third produced a maximum of about 190 ml. upon heating at 149° C. for 50 seconds, N,N'-dimethyl-N,N'-dinitrosoterephthalamide (Nitrosan).

While the above describes the preferred embodiments of our invention, it will be understood that departures may be made therefrom within the scope of the specification and claims.

We claim:

1. A process for making plastic foam which comprises heating a normally solid, thermoplastic macromolecular polymeric material having a decomposition temperature above about 200° C. and a softening temperature below about 150° C. in the presence of a small proportion of a beta propiolactone of the forumla

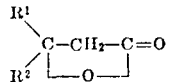

wherein R¹ is selected from the group consisting of hydrogen and lower alkyl, R² is a member selected from the group consisting of hydrogen, methyl, phenyl, lower alkene, lower carboxyalkyl and wherein R¹ and R² together are

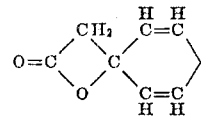

at a temperature effective to decompose the beta-propiolactone to carbon dioxide and a polymerizable monomer, permitting the polymeric material to expand while preventing escape of substantial proportions of carbon dioxide from the polymer mass, and thereafter cooling the polymer mass before a substantial proportion of the thus generated carbon dioxide has escaped from the polymer mass.

2. The process of claim 1, wherein the beta-propiolactone is beta-isovalerolactone.

3. The process of claim 1 wherein the beta-propiolactone is beta-phenyl-beta propiolactone.

4. The process according to claim 1 wherein the polymeric material is an unsaturated polyester resin.

5. The process according to claim 1 wherein the polymeric material is an unsaturated polyester resin and the beta-propiolactone is beta-phenyl-beta-propiolactone.

6. The process according to claim 1 wherein the polymeric material is polyvinyl chloride.

7. The process according to claim 1 wherein the polymeric material is polyvinyl chloride in the form of solid particles dispersed in a liquid plasticizer.

8. The process according to claim 1 wherein the polymeric material is polyvinyl chloride and the beta-propiolactone is beta-isovalerolactone.

9. The process according to claim 1 wherein the polymeric material is chlorinated polyethylene.

10. A process for making plastic foam which comprises heating a normally solid, thermoplastic, unsaturated polyester mass having a decomposition temperature above about 200° C. and a softening temperature below about 150° C. in the presence of a small proportion of a beta propiolactone of the formula

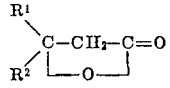

wherein R¹ is selected from the group consisting of hydrogen and lower alkyl, R² is a member selected from the group consisting of hydrogen, methyl, phenyl, lower alkene, lower carboxyalkyl and wherein R¹ and R² together are

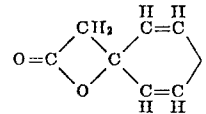

at a temperature effective to decompose the beta-propiolactone to carbon dioxide and a polymerizable monomer and to cross-link said polyester by means of said monomer, permitting the mass to expand while preventing escape of substantial proportions of carbon dioxide from the mass, and maintaining cross-linking reaction conditions until the mass forms a rigid, infusible polyester foam.

11. A composition of matter capable of producing a foam on heating which comprises a mixture of a normally solid, thermoplastic macromolecular polymeric material having a decomposition temperature above about 200° C. and a softening temperature below about 150° C. and a small proportion of a beta propiolactone of the formula

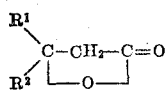

wherein $R^1$ is selected from the group consisting of hydrogen and lower alkyl, $R^2$ is a member selected from the group consisting of hydrogen, methyl, phenyl, lower alkene, lower carboxyalkyl and wherein $R^1$ and $R^2$ together are

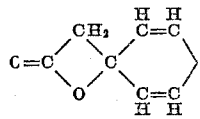

12. The composition of claim 11 wherein the beta propiolactone is isovalerolactone.
13. The composition of claim 11 wherein the polymeric material is polyvinyl chloride.
14. The composition of claim 13 wherein the polyvinyl chloride is present as a polyvinyl chloride plastisol.
15. The composition of claim 11 wherein the polymeric material is chlorinated polyethylene.
16. The composition of claim 11 wherein the polymeric material is an unsaturated polyester resin.

References Cited by the Examiner
UNITED STATES PATENTS

| | | | |
|---|---|---|---|
| 2,361,036 | 10/1944 | Kung | 260—78.3 |
| 2,487,885 | 11/1949 | Magoffin et al. | 260—78.3 |
| 3,224,982 | 12/1965 | Zutty et al. | 260—2.5 |

MURRAY TILLMAN, *Primary Examiner.*

N. F. OBLON, *Assistant Examiner.*